United States Patent
Fukutani et al.

(10) Patent No.: US 9,494,041 B2
(45) Date of Patent: Nov. 15, 2016

(54) PART-FASTENING STRUCTURE

(71) Applicant: HONDA MOTOR CO., LTD., Tokyo (JP)

(72) Inventors: Masayuki Fukutani, Wako (JP); Kenichi Senda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/643,119

(22) Filed: Mar. 10, 2015

(65) Prior Publication Data

US 2015/0260231 A1    Sep. 17, 2015

(30) Foreign Application Priority Data

Mar. 14, 2014   (JP) .................................. 2014-051866

(51) Int. Cl.
*F01D 5/00*       (2006.01)
*F01D 5/06*       (2006.01)
*F16D 1/108*    (2006.01)
*F16D 1/10*      (2006.01)

(52) U.S. Cl.
CPC ........... *F01D 5/066* (2013.01); *F05D 2260/30* (2013.01); *F16D 1/108* (2013.01); *F16D 2001/103* (2013.01); *Y10T 403/56* (2015.01)

(58) Field of Classification Search
None
See application file for complete search history.

(56) References Cited

U.S. PATENT DOCUMENTS

| | | | | |
|---|---|---|---|---|
| 3,631,688 A * | 1/1972 | Quick | ..................... | F01D 5/026 403/316 |
| 3,790,304 A * | 2/1974 | Langlois | .................. | B63H 1/20 416/207 |
| 4,425,827 A * | 1/1984 | Wells | .................... | E21B 19/168 81/57.19 |
| 4,698,998 A * | 10/1987 | Varnagy | ................ | G01L 27/005 137/596 |
| 4,973,221 A * | 11/1990 | Anderson | ............... | F01D 25/04 188/379 |
| 5,817,119 A * | 10/1998 | Klieman | ................ | A61B 17/29 606/170 |
| 6,966,191 B2 * | 11/2005 | Fukutani | .................. | F01D 3/02 60/39.08 |
| 7,207,581 B2 * | 4/2007 | Osborne | ............... | B62D 11/04 180/6.3 |
| 7,293,500 B2 * | 11/2007 | Futamura | ............... | B30B 15/14 100/230 |
| 7,574,891 B2 * | 8/2009 | Futamura | .................. | B30B 1/18 100/280 |
| 7,624,580 B2 * | 12/2009 | Fukutani | ................ | F01D 5/082 60/39.08 |
| 8,075,414 B2 * | 12/2011 | Owen et al. | ..................... | 473/44 |
| 8,424,939 B2 * | 4/2013 | Slack | ..................... | E21B 19/07 294/86.25 |

FOREIGN PATENT DOCUMENTS

JP    2006-189065    7/2006

* cited by examiner

*Primary Examiner* — Victor MacArthur
(74) *Attorney, Agent, or Firm* — Rankin, Hill & Clark LLP

(57) ABSTRACT

In a part-fastening structure, one of respective threads of a first nut member for fastening a first part and a second nut member for fastening a second part, is a right-hand thread, and the other is a left-hand thread. The members are connected together by a connecting member against relative rotation. Thus, rotation of the first member in its loosening direction acts in a direction of fastening the second member via the connecting member, and rotation of the second member in its loosening direction acts in a direction of fastening the first member via the connecting member, so that looseness of both the members is prevented, while reducing the number of locking parts to minimize an increase in an axial dimension.

3 Claims, 4 Drawing Sheets

PART-FASTENING STRUCTURE

CROSS REFERENCE TO RELATED APPLICATIONS

The present application claims priority under 35 U.S.C. §119 to Japanese Patent Application No. 2014-51866 filed Mar. 14, 2014 the entire contents of which are hereby incorporated by reference.

BACKGROUND OF THE INVENTION

1. Field of the Invention

The present invention relates to a part-fastening structure for: fastening a tubular first part, fitted to an outer periphery of a rotary shaft, to the rotary shaft in an axial direction with a first nut member which is screwed onto the outer periphery of the rotary shaft; and fastening a second part, fitted to an outer periphery of the first part, to the first part in the axial direction with a second nut member which is screwed onto the outer periphery of the first part.

2. Description of the Related Art

Japanese Patent Application Laid-open No. 2006-189065 has made publicly known a part-fastening structure which is used to fasten a part, fitted to an outer periphery of a rotary shaft, to the rotary shaft in an axial direction with nuts. In the part-fastening structure, a first external thread portion with a larger diameter and a second external thread portion with a smaller diameter, which are different in twisting direction from each other, are continuously formed on the outer periphery of the rotary shaft. The part is fastened to the rotary shaft with a first nut which is screwed onto the first external thread portion. Thereafter, a second nut screwed onto the second external thread portion is brought into pressure contact with the first nut. Thereby, the first nut and the second nut are prevented from becoming loosened.

The foregoing part-fastening structure can prevent the first and second nuts from becoming loosened, when: sufficiently large frictional force are acting on contact portions of the respectively first and second nuts; and the two nuts accordingly do not turn relative to each other. On the other hand, insufficient frictional force raises not only a problem that the two nuts are likely to become loosened because the contact portions of the two respective nuts slip over each other, but also a problem that a dimension of the rotary shaft in the axial direction increases by the second nut needed to prevent loosening.

SUMMARY OF THE INVENTION

The present invention has been made with the foregoing situation taken into consideration. An object of the present invention is to inhibit an increase in a dimension in an axial direction, and to concurrently prevent first and second nut members from becoming loosened, when fastening first and second parts to an outer periphery of a rotary shaft with the first and second nut members.

In order to achieve the object, according to a first feature of the present invention, there is provided a part-fastening structure for: fastening a tubular first part, fitted to an outer periphery of a rotary shaft, to the rotary shaft in an axial direction with a first nut member which is screwed onto the outer periphery of the rotary shaft; and fastening a second part, fitted to an outer periphery of the first part, to the first part in the axial direction with a second nut member which is screwed onto the outer periphery of the first part, wherein one of a thread of the first nut member and a thread of the second nut member is a right-hand thread, and the other is a left-hand thread, and the first nut member and the second nut member are connected together by a connecting member against relative rotation.

According to the first feature of the present invention, the tubular first part, fitted to the outer periphery of the rotary shaft, is fastened to the rotary shaft in the axial direction with the first nut member which is screwed onto the outer periphery of the rotary shaft, and the second part, fitted to the outer periphery of the first part, to the first part in the axial direction with the second nut member which are screwed onto the outer periphery of the first part. One of the thread of the first nut member and the thread of the second nut member is the right-hand thread, and the other is the left-hand thread. The first nut member and the second nut member are connected together by the connecting member against relative rotation. For these reasons, a rotation of the first nut member in a direction in which the first nut member becomes loosened acts in a direction of fastening the second nut member via the connecting member. Accordingly, both the first nut member and the second nut member are prevented from becoming loosened at the same time. On the other hand, a rotation of the second nut member in a direction in which the second nut member becomes loosened acts in a direction of fastening the first nut member via the connecting member. Accordingly, both the first nut member and the second nut member are prevented from becoming loosened at the same time. This makes it possible to reduce the number of parts for preventing looseness, to minimize an increase in a dimension in the axial direction, as well as to securely prevent the first nut member and the second nut member from becoming loosened.

According to a second feature of the present invention, in addition to the first feature, the first nut member includes a first groove portion opened to one end side in the axial direction, the second nut member includes a second groove portion opened to the one end side in the axial direction, and the connecting member includes a first projecting portion capable of engaging with the first groove portion, and a second projecting portion capable of engaging with the second groove portion.

According to the second feature of the present invention, the first nut member includes the first groove portion opened to the one end side in the axial direction; the second nut member includes the second groove portion opened to the one end side in the axial direction; and the connecting member includes the first projecting portion capable of engaging with the first groove portion, and the second projecting portion capable of engaging with the second groove portion. For these reasons, prevention of the first nut member and the second nut member from becoming loosened can be securely achieved by only a simple operation of: inserting the connecting member in the axial direction; and fitting the first and second projecting portions into the first and second groove portions, respectively.

Note that a low-pressure system shaft 15 of an embodiment corresponds to the rotary shaft of the present invention, a sleeve 41 of the embodiment corresponds to the first part of the present invention, and an inner race 45 of the embodiment corresponds to the second part of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

Descriptions will be hereinbelow provided for an embodiment of the present invention on the basis of FIGS. 1 to 4.

Figure 1:
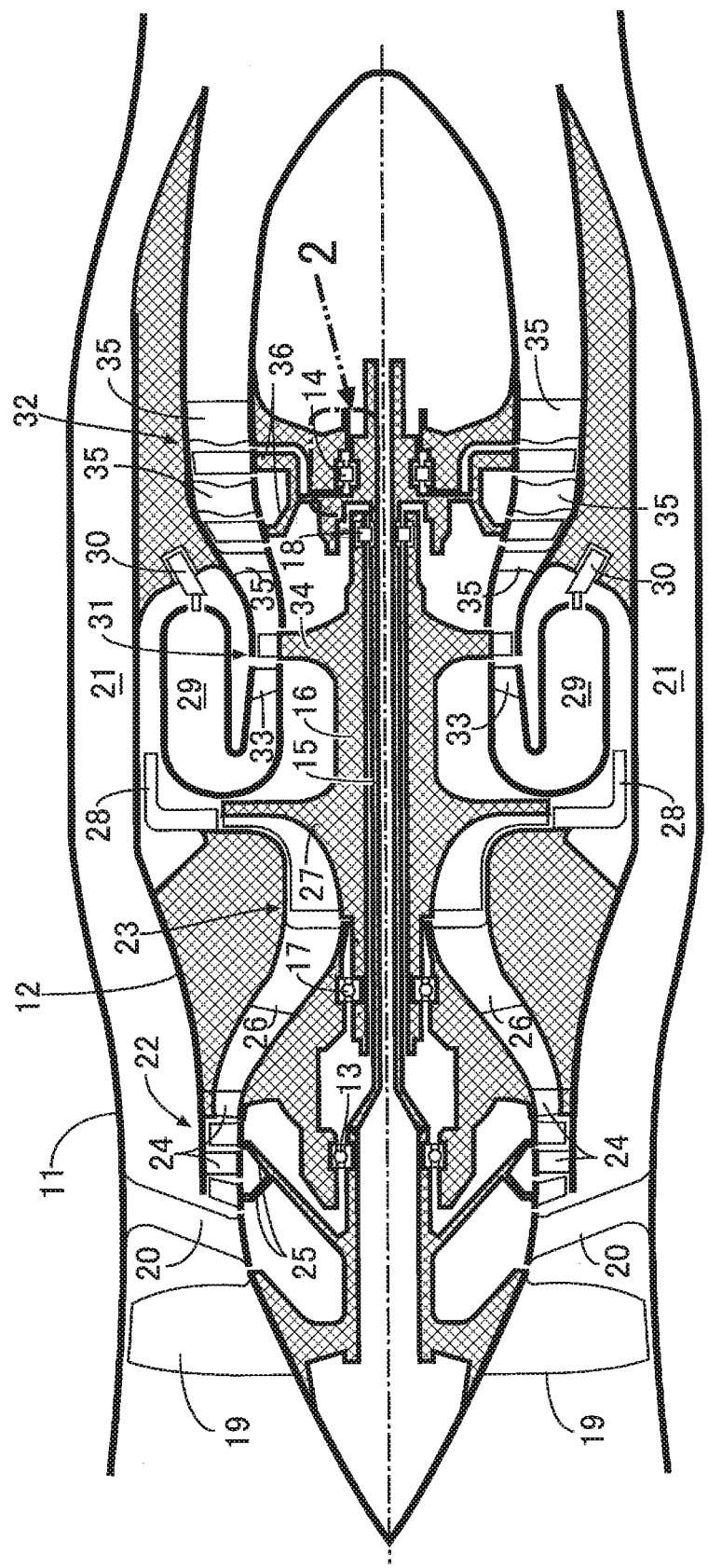
FIG. 1 is a view showing an overall structure of a twin-spool turbofan engine.

As shown in FIG. 1, a twin-spool turbofan engine for an aircraft to which the present invention is applied includes an outer casing 11 and an inner casing 12. Front and rear portions of a low-pressure system shaft 15 are rotatably supported by an inside of the inner casing 12 via front and rear first bearings 13, 14, respectively. A tubular high-pressure system shaft 16 is fitted to an outer periphery of an axial-direction intermediate portion of the low-pressure system shaft 15 in a relatively rotatable manner. A front portion of the high-pressure system shaft 16 is rotatably supported by the inner casing 12 via a front second bearing 17, while a rear portion of the high-pressure system shaft 16 is supported by the low-pressure system shaft 15 in a relatively rotatable manner via a rear second bearing 18.

A front fan 19 having blade ends which face an inner surface of the outer casing 11 is fixed to a front end of the low-pressure system shaft 15. Part of air sucked by the front fan 19 passes through stator vanes 20 disposed between the outer casing 11 and the inner casing 12. Part of the air having passed through the stator vanes 20 thereafter passes through an annular bypass duct 21 formed between the outer casing 11 and the inner casing 12, and is jetted rearward. Other part of the air is supplied to an axial low-pressure compressor 22 and a centrifugal high-pressure compressor 23 which are disposed inside the inner casing 12.

The low-pressure compressor 22 includes: stator vanes 24 fixed to the inside of the inner casing 12; and a low-pressure compressor wheel 25 having compressor blades on its outer periphery, and fixed to the low-pressure system shaft 15. The high-pressure compressor 23 includes stator vanes 26 fixed to the inside of the inner casing 12; and a high-pressure compressor wheel 27 having compressor blades on its outer periphery, and fixed to the high-pressure system shaft 16.

A reverse-flow combustion chamber 29 is disposed in a rear of a diffuser 28 connected to an outer periphery of the high-pressure compressor wheel 27. Fuel injection nozzles 30 inject fuel into the reverse-flow combustion chamber 29. The fuel and the air are mixed together and combusted inside the reverse-flow combustion chamber 29. The generated combustion gas is supplied to a high-pressure turbine 31 and a low-pressure turbine 32.

The high-pressure turbine 31 includes: nozzle guide vanes 33 fixed to the inside of the inner casing 12; and a high-pressure turbine wheel 34 having turbine blades on its outer periphery, and fixed to the high-pressure system shaft 16. The low-pressure turbine 32 includes: nozzle guide vanes 35 fixed to the inside of the inner casing 12; and low-pressure turbine wheels 36 each having turbine blades on its outer periphery, and fixed to the low-pressure system shaft 15.

For this reason, once the high-pressure system shaft 16 is driven by a starter motor (not illustrated), air sucked by the high-pressure compressor wheel 27 is supplied to the reverse-flow combustion chamber 29, and mixed with the fuel to be combusted. The generated combustion gas drives the high-pressure turbine wheel 34 and the low-pressure turbine wheels 36. As a result, the low-pressure system shaft 15 and the high-pressure system shaft 16 rotate. Accordingly, the front fan 19, the low-pressure compressor wheel 25 and the high-pressure compressor wheel 27 compress air, and supply the compressed air to the reverse-flow combustion chamber 29. Thereby, even after operation of the starter motor is stopped, the turbofan engine continues its operation.

While the turbofan engine is in operation, part of air sucked by the front fan 19 passes through the bypass duct 21, and is jetted rearward so as to, particularly during low-speed flight, generate main thrust. The remaining part of the air sucked by the front fan 19 is supplied to the reverse-flow combustion chamber 29, and is mixed with the fuel to be combusted. The combusted gas drives the low-pressure system shaft 15 and the high-pressure system shaft 16, and is thereafter jetted rearward, generating thrust.

Figure 2:
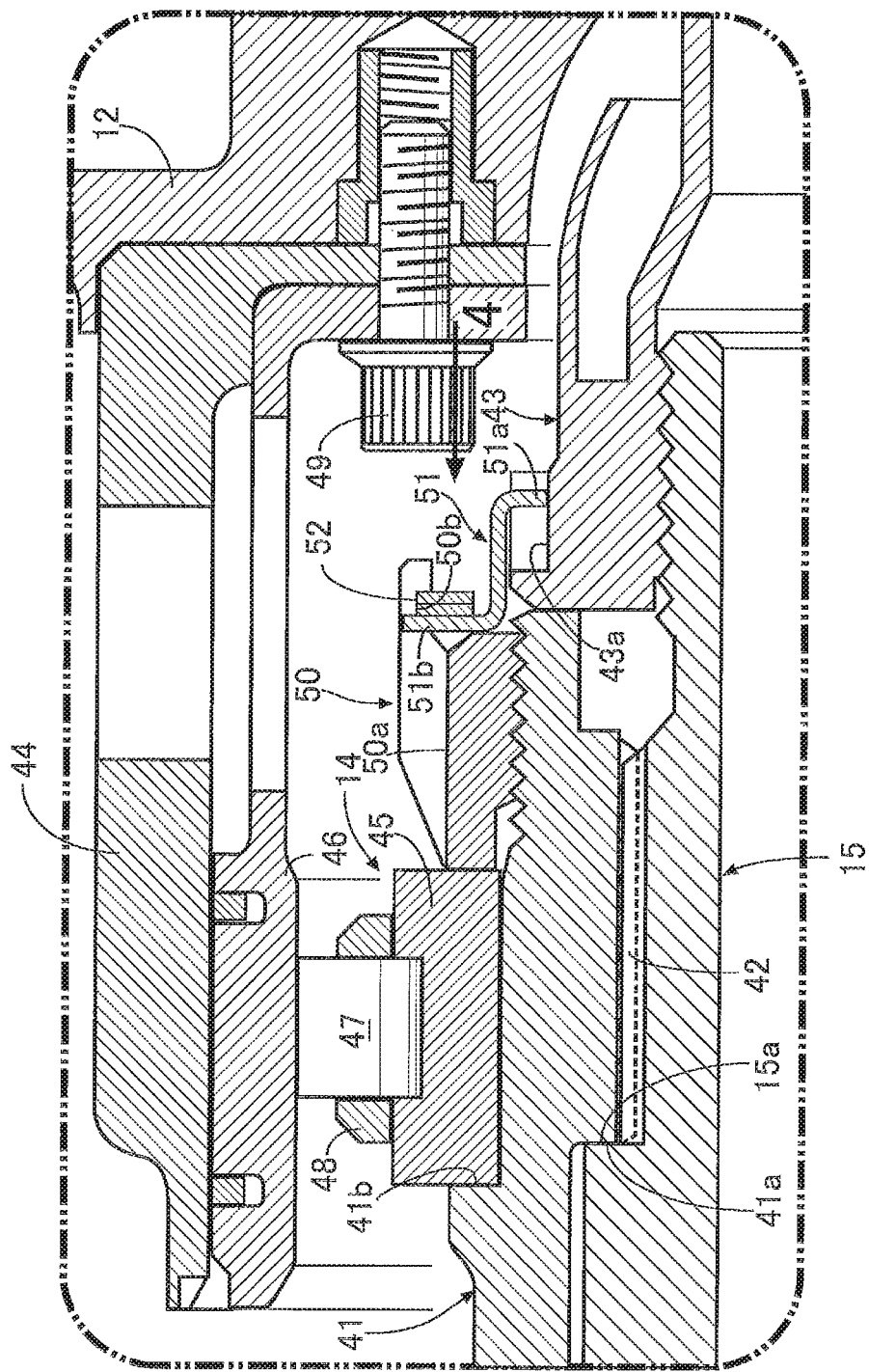
FIG. 2 is an enlarged view of a section 2 in FIG. 1.
Figure 3:
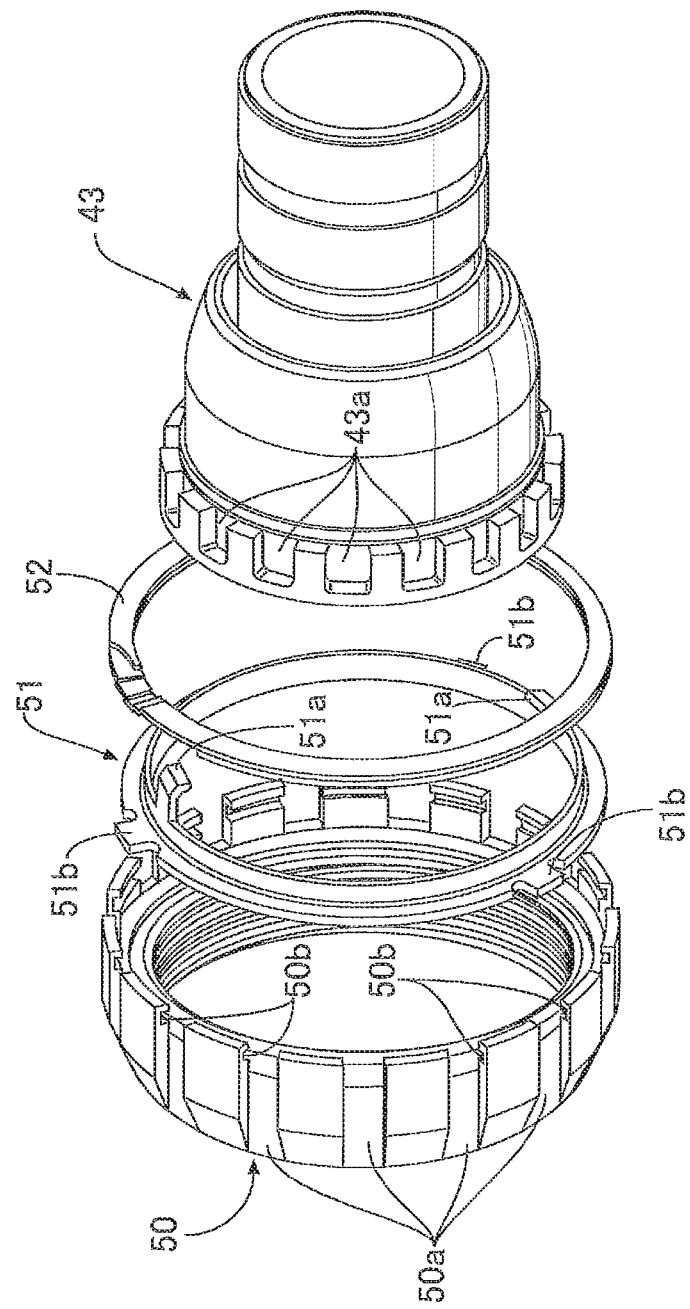
FIG. 3 is an exploded perspective view of first and second nut members, a connecting member, as well as a ring spring.
Figure 4:
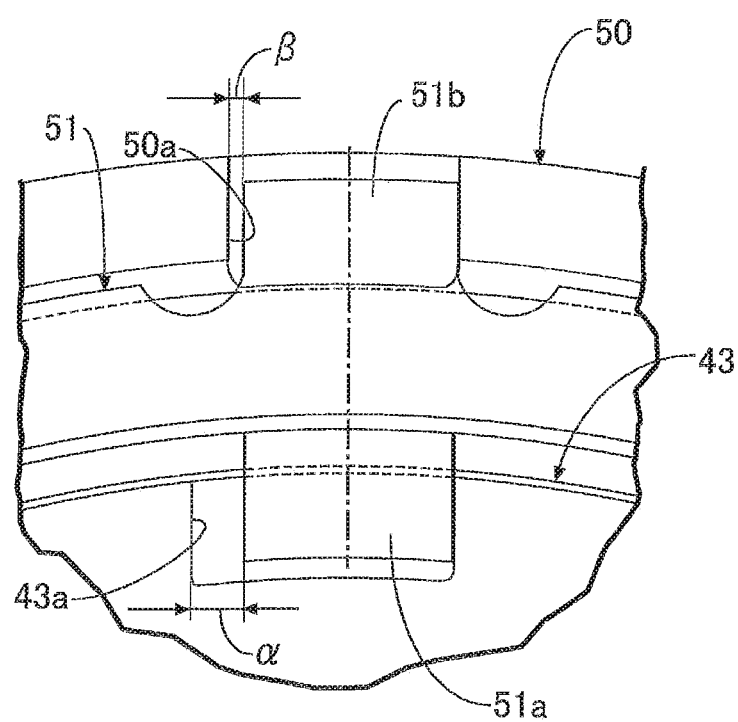
FIG. 4 is a view of a part shown in a direction indicated with an arrow 4 in FIG. 2.

Next, descriptions will be provided for a structure around the rear first bearing 14 on the basis of FIGS. 2 to 4.

A sleeve 41 (tubular first part) for supporting the low-pressure turbine wheels 36 is spline-fitted as at 42 to an outer periphery of the low-pressure system shaft 15. The sleeve 41 is fastened to the low-pressure system shaft 15 by: pushing the sleeve 41 to the left in FIG. 2 while screwing a first nut member 43 onto an outer periphery of an axial end of the low-pressure system shaft 15; and pressing a step portion 41a formed on an inner periphery of the sleeve 41 against a step portion 15a formed on the outer periphery of the low-pressure system shaft 15.

The rear first bearing 14 includes: an inner race 45 (second part) fitted to an outer periphery of the sleeve 41; an outer race 46 fitted to an inner periphery of a bearing holding member 44 of the inner casing 12; multiple rollers 47 disposed between the inner race 45 and the outer race 46; and a retainer 48 for retaining the rollers 47 lest the rollers 47 should come off. The bearing holding member 44 and the outer race 46 are fastened to the inner casing 12 with bolts 49. The inner race 45 is fastened to the sleeve 41 by: biasing the inner race 45 to the left in FIG. 2 with a second nut member 50 which is screwed onto an outer periphery of an end portion of the sleeve 41; and pressing the inner race 45 against a step portion 41b which is formed in the outer periphery of the sleeve 41.

A direction of a thread of the first nut member 43 and a direction of a thread of the second nut member 50 are set reverse to each other. In other words, in a case where the first nut member 43 is a right-hand thread, the second nut member 50 is a left-hand thread. In a case where the first nut member 43 is a left-hand thread, the second nut member 50 is a right-hand thread.

Multiple first groove portions 43a opened to the right in the axial direction in FIG. 2 are formed in an outer periphery of an end portion of the first nut member 43 at equal intervals in a peripheral direction. Multiple second groove portions 50a opened to the right in the axial direction in FIG. 2 are formed in an outer periphery of the second nut member 50 at equal intervals in the peripheral direction.

An annular connecting member 51 disposed between the first nut member 43 and the second nut member 50 includes: two first projecting portions 51a disposed at 180-degree intervals in the peripheral direction, and being capable of engaging with the corresponding first groove portions 43a of the first nut member 43; and three second projecting portions 51b disposed at 120-degree intervals in the peripheral direction, and being capable of engaging with the corresponding second groove portions 50a of the second nut member 50.

A ring spring 52 for locking the connecting member 51 to the second nut member 50 is formed by winding a flat elastic metal plate into substantially two circles. An outer peripheral portion of the ring spring 52 is capable of engaging with step portions 50b which are formed in an inner periphery of an end portion of the second nut member 50.

Next, descriptions will be provided for an operation of the embodiment of the present invention including the foregoing configuration.

The inner race 45 of the rear first bearing 14, which is fitted to the outer periphery of the sleeve 41, is fastened to the sleeve 41 by: biasing the inner race 45 to the left in FIG. 2 with the second nut member 50 which is screwed onto the axial end of the sleeve 41; and pressing the inner race 45 against the step portion 41b of the sleeve 41. In addition, the sleeve 41, which is fitted to the outer periphery of the low-pressure system shaft 15, is fastened to the low-pressure system shaft 15 by: biasing the sleeve 41 to the left in FIG. 2 with the first nut member 43 which is screwed onto the axial end of the low-pressure system shaft 15; and pressing the step portion 41a of the sleeve 41 against the step portion 15a of the low-pressure system shaft 15.

With this condition kept, the connecting member 51 is fitted to an outer periphery of the first nut member 43; the second projecting portions 51b are fitted into the corresponding second groove portions 50a of the second nut member 50; and the first projecting portions 51a are fitted into the corresponding first groove portions 43a of the first nut member 43. Thereafter, for the purpose of preventing the connecting member 51 from coming off, the ring spring 52 is attached to the step portions 50b which are formed in the inner periphery of the end portion of the second nut member 50. To this end, the spirally-overlapping ring spring 52 is further wound and fastened to reduce an outer diameter of the ring spring 52, and is inserted into an axially inside of the step portions 50b of the second nut member 50 while holding the reduced diameter. Once set free, the ring spring 52 expands wider due to its elasticity, and automatically engages with the step portions 50b. Thereby, the ring spring 52 becomes locked and thus prevents the connecting member 51 from coming off to the right in FIG. 2.

Since the direction of the thread of the first nut member 43 and the direction of the thread of the second nut member 50 are set reverse to each other, a rotation of the first nut member 43 in a direction in which the first nut member 43 becomes loosened acts in a direction of fastening the second nut member 50 via the connecting member 51. Accordingly, both the first nut member 43 and the second nut member 50 are prevented from becoming loosened at the same time. On the other hand, a rotation of the second nut member 50 in a direction in which the second nut member 50 becomes loosened acts in a direction of fastening the first nut member 43 via the connecting member 51. Accordingly, both the first nut member 43 and the second nut member 50 are prevented from becoming loosened at the same time. This makes it possible to reduce the number of parts for preventing looseness, to minimize an increase in a dimension in the axial direction, as well as to securely prevent the first nut member 43 and the second nut member 50 from becoming loosened.

Fitting of the first projecting portions 51a of the connecting member 51 into the corresponding first groove portions 43a of the first nut member 43, and fitting of the second projecting portions 51b of the connecting member 51 into the corresponding second groove portions 50a of the second nut member 50 can be achieved by only inserting the connecting member 51 in the axial direction. Accordingly, prevention of the first nut member 43 and the second nut member 50 from becoming loosened can be achieved by a simple operation alone.

Meanwhile, there is a difference between a phase of the first nut member 43 and a phase of the second nut member 50 when the fastening is completed. For this reason, if there is no clearance between the first projecting portions 51a of the connecting member 51 and the first groove portions 43a of the first nut member 43, and if there is no clearance between the second projecting portions 51b of the connecting member 51 and the second groove portions 50a of the second nut member 50, the connecting member 51 would be unable to be attached to the first nut member 43 and the second nut member 50.

In the embodiment, therefore, a pitch between the first groove portions 43a of the first nut member 43 and a pitch between the second groove portions 50a of the second nut member 50 are set as small as possible. In addition, as shown in FIG. 4, a predetermined peripheral-direction clearance $\alpha$ is set between the first projecting portion 51a of the connecting member 51 and the first groove portion 43a of the first nut member 43, while a predetermined peripheral-direction clearance $\beta$ is set between the second projecting portion 51b of the connecting member 51 and the second groove portion 50a of the second nut member 50. Thereby, the connecting member 51 is attachable to the first nut member 43 and the second nut member 50 regardless of the phase of the first nut member 43 and the phase of the second nut member 50 when the fastening is completed.

However, if the clearances $\alpha$, $\beta$ are set excessively large, the first nut member 43 or the second nut member 50 becomes loosened as a result of rotating within a range of the clearance $\alpha$ or the clearance $\beta$. For this reason, the clearances $\alpha$, $\beta$ need to be set in a way that necessary minimum fastening torque can be secured even though the first nut member 43 or the second nut member 50 becomes loosened within the range of the clearance $\alpha$ or the clearance $\beta$.

The foregoing descriptions have been provided for the embodiment of the present invention. Various design changes, however, can be made to the present invention within the scope not departing from the gist of the present invention.

For example, although the present invention is applied by the embodiment to the section where the rear first bearing 14 is fastened to the sleeve 41 in the gas turbine engine, the present invention may be applied to any other section.

The direction of the thread of the first nut member 43 and the direction of the thread of the second nut member 50 are arbitrary as long as the directions are reverse to each other.

Furthermore, although the embodiment provides the connecting member 51 with the two first projecting portions 51a and the three second projecting portions 51b, the number of first projecting portions 51a and the number of second projecting portions 51b are arbitrary.

What is claimed is:

1. A part-fastening structure for fastening a tubular first part and a second part to a rotary shaft, the part-fastening structure comprising:
   a first threaded portion defined in an outer periphery of the rotary shaft;
   a rotary shaft step portion defined in the outer periphery of the rotary shaft;
   a second threaded portion defined in an outer periphery of the tubular first part;
   a first part step portion defined in the outer periphery of the tubular first part;

a first nut member which is threaded and screwed onto the first threaded portion defined in the outer periphery of the rotary shaft, the first nut member pressing the tubular first part in an axial direction into the rotary shaft step portion to fasten the tubular first part to the rotary shaft;

a second nut member which is threaded and screwed onto the second threaded portion defined in the outer periphery of the tubular first part, the second nut member pressing the second part in the axial direction into the first part step portion to fasten the second part to the tubular first part; and a connecting member connecting the first nut member to the second nut member against relative rotation, wherein one of a thread of the first nut member and a thread of the second nut member is a right-hand thread, and the other is a left-hand thread.

2. The part-fastening structure according to claim 1, wherein the first nut member includes a first groove portion opened to one end side in the axial direction, the second nut member includes a second groove portion opened to the one end side in the axial direction, and the connecting member includes a first projecting portion engaged with the first groove portion, and a second projecting portion engaged with the second groove portion.

3. The part-fastening structure according to claim 2, wherein a ring spring is provided for locking the connecting member, and an outer peripheral portion of the ring spring engages a second nut member step portion formed in an inner periphery of an end portion of the second nut member.

* * * * *